Oct. 6, 1953 — E. D. GRIZZARD ET AL — 2,654,135
RELEASABLE CONNECTION DEVICE
Filed June 25, 1951 — 2 Sheets-Sheet 1
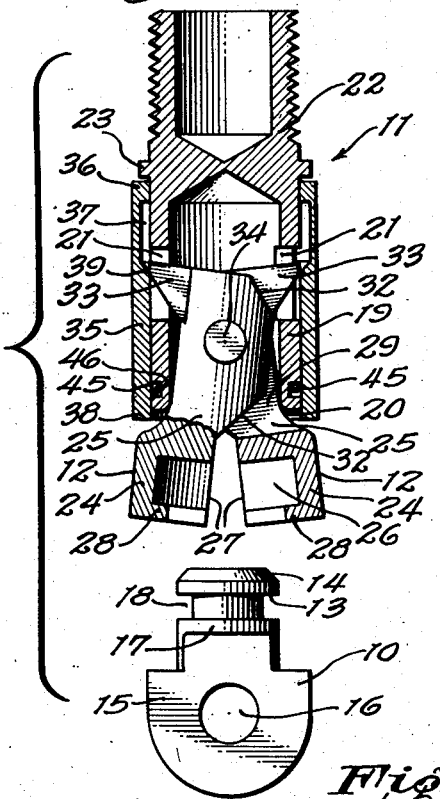
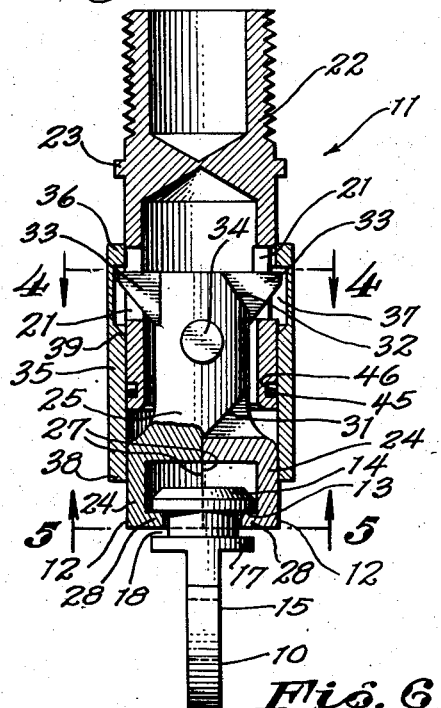
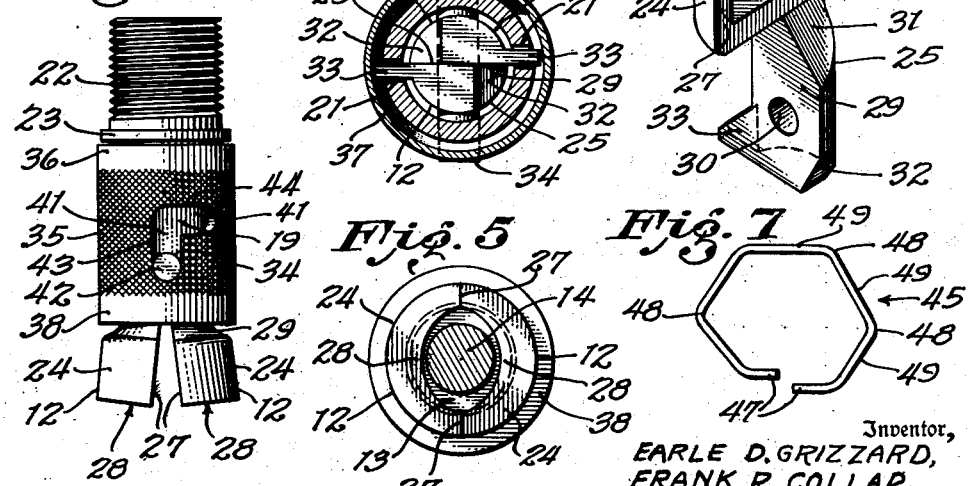
Inventor,
EARLE D. GRIZZARD,
FRANK R. COLLAR,
JACK C. MITCHELL,
By _____ Attorney Oct. 6, 1953     E. D. GRIZZARD ET AL     2,654,135
RELEASABLE CONNECTION DEVICE
Filed June 25, 1951     2 Sheets-Sheet 2
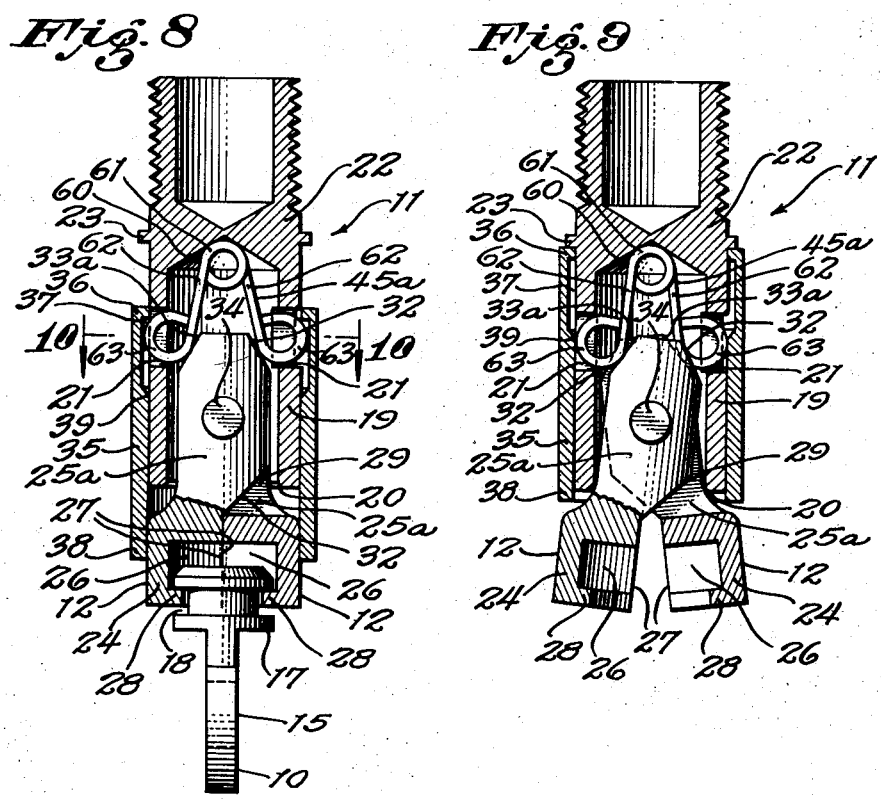
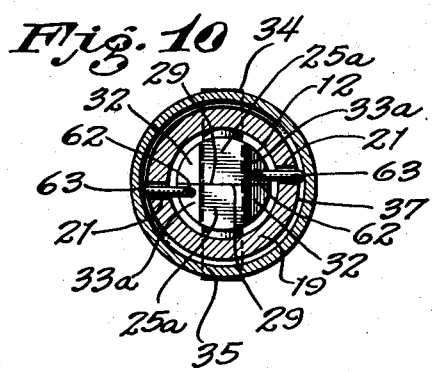
Inventors,
EARLE D. GRIZZARD
FRANK R. COLLAR
JACK C. MITCHELL
By
Attorney Patented Oct. 6, 1953

2,654,135

UNITED STATES PATENT OFFICE 2,654,135

RELEASABLE CONNECTION DEVICE

Earle D. Grizzard and Frank R. Collar, Los Angeles, and Jack C. Mitchell, La Crescenta, Calif., assignors to Adams Rite Manufacturing Company, Glendale, Calif., a corporation of California Application June 25, 1951, Serial No. 233,394

10 Claims. (Cl. 24—201)

This invention relates to a device for use in securing cargo in aircraft, or for providing a rigid and strong, but releasable connection between parts.

It is an object of the invention to provide a releasable connection which will make a positive connection between selected parts, having locking means of simple form so that it will not be subject to accidental release, yet being simple to operate so that the parts may be connected and disconnected without difficulty, and in a substantially instantaneous manner.

It is an object of the invention to provide a releasable connector having a shouldered part and an engagement assembly adapted to be quickly connected to and disconnected from the shouldered member.

It is a further object of the invention to provide an engagement assembly having a body with engagement or jaw members movably mounted thereon and simple means for positively holding these jaw members in engagement with the shouldered member.

A further object of the invention is to provide in this engagement assembly an actuating part which is movable on the body of the assembly from retracted to extended positions, the actuating part having means for shifting the engagement members into releasing positions when the actuating part is in its retracted position, and for moving the engagement members into engaging position when the actuating part is moved to extended position.

It is an object of the invention to provide an engagement assembly including a tubular body having an end opening, jaw members disposed adjacent this end opening, each of the jaw members having a lever portion extending into the interior of the tubular body and swingably supported therein by hinge means, there being a sleeve movable on the tubular body into a projecting or extending position so as to surround at least a portion of each jaw member to hold the jaw members in engagement with the shouldered member.

A further object of the invention is to provide an engagement assembly such as described in the preceding paragraph wherein the tubular body also has side openings through which means act when the sleeve is in retracted position to hold the levers in such position that the jaw members will separate ready to receive the head portion of the shouldered member.

Further objects and advantages of the invention will be brought out the following part of the specification wherein the details of a preferred embodiment of the invention have been described for the purpose of disclosure not for the purpose of limiting the scope of the invention which is set forth in the appended claims and without limiting the range of equivalence to which the claims are entitled.

Referring to the drawings which are for illustrative purposes only:

Fig. 1 is a partly sectional view showing the component parts of the connector separated and ready for attachment;

Fig. 2 is a partly sectional view similar to Fig. 1 but showing the connector parts engaged;

Fig. 3 is an external view of the engagement assembly of the connector;

Fig. 4 is a cross-section taken as indicated at the line 4—4 of Fig. 2;

Fig. 5 is a sectional view taken as indicated by the line 5—5 of Fig. 2;

Fig. 6 is an enlarged perspective view of one of the engagement members;

Fig. 7 is a perspective view of the friction spring employed in the device;

Fig. 8 is a sectional view similar to Fig. 2 showing an alternative form of the invention with connector parts engaged;

Fig. 9 is a sectional view similar to Fig. 8 showing the connector parts disengaged; and Fig. 10 is a cross-section taken as indicated at the line 10—10 of Fig. 8.

The detachable connector shown in Fig. 1 comprises a shouldered member 10 and an assembly 11 arranged for disconnection as shown in Fig. 1 and for connection as shown in Fig. 2. The assembly 11 is referred to as the engagement assembly for the reason that it has engagement members 12 adapted to engage the shoulder 13 of the head 14 which is formed on the upper portion of the shouldered member 10.

The shouldered member 10 comprises a plate portion 15, face and edge views of which are respectively shown in Figs. 1 and 2, this plate portion having a bolt hole 16 for use in attaching it in the structure of the aircraft in which the device is to be used in cargo holddown purposes. The head 14 of the shouldered member 10 is circular or cylindrical and below the annular shoulder 13 thereof, has an annular shoulder 17 spaced by an annular channel 18 from the shoulder 13.

The engagement assembly 11 includes a tubular body 19 having a lower end opening 20 and having diametrally opposed side openings 21. From the upper end of the tubular body 19 a connecting means 22 extends, this connecting means being shown as an externally threaded projection for use in connection of the engagement assembly 11 to the part which is to be detachably connected to the shouldered member 10. Between the tubular body 19 and the externally threaded portion 22 there is an annular shoulder 23.

In the form of the invention disclosed, there are two engagement members 12. Each of these engagement members includes an engagement portion 24 and a lever portion 25 extending therefrom. As shown in Figs. 1, 2 and 6, each engagement portion 24 is of similar cylindrical form and has a cavity 26 extending thereinto from its diametral face 27, the cavity 26 being of such size that it will receive one-half of the annular shoulder or flange 13 of the shouldered member 10. The engagement portion 24 has a shoulder 28 adapted to lie below the shoulder 13 and extend into the annular channel 18 of the head 14. Each lever portion 25 is of substantially semi-cylindrical cross-section, with a diametral face 29 arranged in a plane which is perpendicular to the plane of the face 27 of the engagement portion 24. The lever portion 25 has a pin opening 30 extended therethrough and as indicated at 31 and 32 the lever portion 25 is relieved. At the end of the lever portion 25, opposite from the engagement portion 24 there is a projection 33. The engagement members 12 are identical in form, and a pair of them are assembled in the engagement assembly 11 with the faces 29 of the lever portion 25 in engagement. These lever portions 25, as shown in Figs. 1, 2 and 4, are extended into the interior of the tubular body through the end opening 20 thereof and are swung on a pin 34 which projects through opposite sides of the wall of the tubular body 19 and through the openings 30 of the lever portions 25. When the engagement members 12 are installed in the tubular body 19 the projections 33 extend outwardly into and through the side openings 21 of the tubular body 19. When the levers are positioned as shown in Fig. 1 the points of the projections 33 lie in the openings 21, but do not project outwardly beyond the outer face of the tubular body 19. When the lever portions 25 are positioned as shown in Fig. 2, the projections 33 are swung outwardly so that the ends or points thereof project from the outer face of the tubular body 19.

When the lever portions 25 are mounted in the tubular body 19 on the pin 34, the engagement portion 24 at the outer ends of the lever portion 25 lie adjacent the end of the tubular body 19, and at this time the diametral faces 27 of the engagement portions 24 are in opposition so that when the engagement members 12 are swung from the position at which they are shown in Fig. 1 to the positions in which they are shown in Fig. 2, the faces 27 of the engagement portions 24 will be brought together or into the so called engagement position, the two semi-cylindrical portions 24 then forming a substantial cylindrical body at the end of the tubular body 19.

Actuating and/or locking means of the engagement members 12 of the assembly 11 consists of a sleeve 35 which fits slidably upon the tubular body 19. Near its inner end 36 the sleeve 35 has an internal channel 37 into which the outer ends of the projection 33 of the lever portion 25 extend when the sleeve 35 is in its locking or extended position shown in Fig. 2. When the sleeve 35 is in retracted position as shown in Fig. 1, the lower end 38 thereof is adjacent the lower end of the tubular body 19. As the sleeve 35 is moved downwardly from its position of Fig. 1 toward its position of Fig. 2, the lower end 38 thereof engages the semi-cylindrical faces of the engagement portions 24 and forces them radially inwardly toward each other, or in closed position around the shoulder 13 of the shouldered member 10, and when the sleeve 35 reaches its fully extended position, as shown in Figs. 2 and 5, the lower end 38 of the sleeve 35 will surround a sufficient portion of the semi-cylindrical engagement portions 24 to prevent them from swinging outwardly, or in other words, to prevent them from becoming disengaged from the member 10.

At the lower extremity of the internal channel 37, the sleeve 35 has an annular shoulder 39 which acts as a cam when the sleeve is moved inwardly from the position in which it is shown in Fig. 2 toward the position in which it is shown in Fig. 1, this shoulder or cam 39 engaging the ends of the projectitons 33 and forcing them inwardly just as the lower end 39 of the cam 35 clears the upper extremities of the semi-cylindrical engagement portions 24, forcing the projections inwardly to the position at which they are shown in Fig. 1 and thereby swinging the engagement members 12 so that the engagement portion 24 thereof will be swung outwardly into the open or disengaged positions in which they are shown in Fig. 1.

The sleeve 35, as shown in Fig. 3, has diametrally opposed angle-slots 41 which receive the outer ends 42 of the diametrally disposed pin 34. These angle-slots 41 are similar in character to bayonet slots and each includes a longitudinal portion 43 and a circumferential portion 44. When the sleeve 35 is retracted as shown in Figs. 1 and 3, the ends of the slot portions 43 receive the ends 42 of the pin 34. When the sleeve 35 is moved outwardly from the position of Fig. 3, referred to as its retracted position, the circumferential slot portions will be brought into alignment with the ends 42 of the pin 34, whereupon the sleeve 35 may be rotated so as to bring the circumferential slot portions 44 into surrounding relation to the pin ends 42, thus locking the sleeve 35 against axial movement from extended to retracted position.

Means of frictional engagement are provided between the tubular body 19 and the sleeve 35, so that the sleeve 35 will not rotate or move freely on the tubular body 19. This means of frictional engagement between the parts consist of a spring member 45 confined in a slot 46 in the external face of the tubular body 19 near its lower end. As shown in Fig. 7, the spring member 45 comprises a length of steel wire bent so as to have polygonal or non-circular form, and likewise the ends 47 of the spring 45 are offset from each other in a direction parallel to the axis of the tubular body 19. The spring 45 has outwardly projecting corner portions 48 and intervening flat portions 49. When the spring 45 is installed, the centers of the flat portions 49 press against the bottom of the groove 46, and the projections or corners 48 press against the inner face of the sleeve 35. Also, the ends 47 of the spring 45 bear against opposite side walls of the groove 46.

In the alternative form of the invention shown in Figs. 8–10, we avoid the necessity of cutting the groove 46 in the tubular body 19. We avoid the use of the spring 49 and of the projections 33 of the levers 25. A spring member 45a is employed which not only serves as a means for swinging the parts 24 into open position but also for retarding movement of the sleeve 35 on the body 19. In this alternative form of the invention all of the parts of the device are the same as those of the preferred form of the invention shown in Figs. 1 to 7, with the exception of the changes herein noted; therefore, the corresponding parts will be indicated by the same numerals so as to avoid the necessity of repetition of description.

The engagement members 12 have levers 25a which differ from the levers 25 of Figs. 1 and 2 by avoidance of the projection 33. Adjacent the position of the eliminated projection 33, each lever 25a is provided with a diagonally disposed face or shoulder 33a, which shoulders 33a confront the slots 21 of the tubular body 19, as best shown in Fig. 10.

The spring member 45a is bent from a length of spring wire 60 so as to have a spring loop 61 of one and a half turns, from which loop 61 legs 62 extend downwardly and outwardly toward the slots 21. On the lower ends of the arms 62, loops 63 are formed which project through the slots 21 as shown in Fig. 8 and extend into the groove 37 of the sleeve 35, when the sleeve 35 is lowered on the tubular body 19 so as to hold the engagement members 12 in closed relation. The loops 63 lie adjacent the shoulders 33a of the levers 25a, and may be in engagement with the shoulders 33a when the sleeve 35 is moved upwardly from the position in which it is shown in Fig. 8 to the position in which it is shown in Fig. 9 on the tubular body 19. The shoulder 39 at the lower end of the annular groove 37 engages the loop 63, forcing the same inwardly so that they in turn press against the shoulders 33a and swing the levers 25a into angular relation as shown in Fig. 9. The outer portions of the loop 63 rest in pressural engagement with the inner surface of the sleeve 35 so as to frictionally restrain the sleeve from free movement on the tubular body 19, thereby accomplishing the function performed by the spring 45 in the preferred form of the invention disclosed in Figs. 1 to 7 inclusive. The loops 63 of the spring 45a serve as connections between the levers 25a and the sleeve 35 to effect opening of the jaws 24 of the engagement members 12 when the sleeve 35 is pulled into retracted position on the tubular body 19.

We claim:
1. In a connector for engaging a shouldered member of the character described, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, said lever portions having parts which project through said side openings when shouldered portions are moved toward each other, a sleeve supported on said tubular body so as to be movable into a position projecting from the end of said tubular body so that a portion of said sleeve will surround said shouldered portions and hold them in engagement with said shouldered member, cam means on said sleeve engaging said projecting parts of said lever portions when said sleeve is moved into retracted position on said tubular body, to force said projecting parts inwardly and swing said lever portions so as to move said shouldered portions of said engagement members apart, and locking means for holding said sleeve in said position projecting from said tubular body.

2. In a connector for engaging a shouldered member of the character described, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, a sleeve supported on said tubular body so as to be movable into a position projecting from the end of said tubular body so that a portion of said sleeve will surround said shouldered portions and hold them in engagement with said shouldered member, means acting between said sleeve and said lever portions through said side openings when said sleeve is moved into retracted position to swing said lever portions so as to separate said shoulder portions of said engagement members, and locking means for holding said sleeve in said position projecting from said tubular body.

3. In a connector for engaging a shouldered member of the character described, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, a sleeve supported on said tubular body so as to be movable into a position projecting from the end of said tubular body so that a portion of said sleeve will surround said shouldered portions and hold them in engagment with said shouldered member, and means acting between said sleeve and said lever portions through said side openings when said sleeve is moved into retracted position to swing said lever portions so as to separate said shoulder portions of said engagement members.

4. In a connector for engaging a shouldered member of the character described, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, said lever portions having parts which project through said side openings when shouldered portions are moved toward each other, a sleeve supported on said tubular body so as to be movable into a position projecting from the end of said tubular body so that a portion of said sleeve will surround said shouldered portions and hold them in engagement with said shouldered member, and cam means on said sleeve engaging said projecting parts of said lever portions when said sleeve is moved into retracted position on said tubular body, to force said projecting parts inwardly and swing said lever portions so as to move said shoulder portions of said engagement members apart.

5. In a connector for engaging a shouldered member of the character described, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, a sleeve supported on said tubular body so as to be movable into a position projecting from the end of said tubular body so that a portion of said sleeve will surround said shouldered portions and hold them in engagement with said shouldered member, said sleeve having an internal position so as to move over said side openings when said sleeve is moved into retracted position on said tubular body, and a spring member in said tubular body having parts arranged to project through said openings and to provide operative connections between said internal shoulder of said sleeve and said lever portions, to swing said lever portions so as to move said shouldered portion of said engagement members apart when said sleeve is moved into retracted position on said tubular body.

6. In a connector for engaging a shouldered member of the character decribed, the combination of: a tubular body having an end opening and side openings, engagement members having shouldered portions movable toward each other into engagement with said shouldered member and movable away from each other to disengage said shouldered member, said engagement members having lever portions extending into said tubular body through said end opening, pin means pivotally supporting said lever portions in said tubular body, a sleeve supported on said tubular body so as to be movable into a position projecting from the end of said tubular body so that a portion of said sleeve will surround said shouldered portions and hold them in engagement with said shouldered member, said sleeve having an internal position so as to move over said side openings when said sleeve is moved into retracted position on said tubular body, and a spring member having diverging legs with loops on the ends of said legs, said loops projecting through said side openings so that the outer portions thereof will be engaged and said loops will be forced inwardly by said internal shoulder when said sleeve is moved into retracted position on said tubular body, said spring member having parts which engage said lever members and swing said engagement members apart when said loops are forced inwardly.

7. In a connector adapted to engage a shouldered member of the character described: a body having end and side openings; engagement members having shouldered portions movable toward each other into engagement with said shouldered member and movable away from each other to disengage said shouldered member, said engagement members having lever portions extending in said end opening of said body, pin means carried by said body so as to pivotally support said lever portions in said body, said lever portions having parts which project through said side openings when shouldered portions are moved toward each other; a sleeve supported on said body so as to be movable into a position wherein the end portion of said sleeve will surround said shouldered portions and hold them in engagement with said shouldered member; cam means on said sleeve engaging said projecting parts of said lever portions when said sleeve is moved into retracted position on said body, to force said projecting parts inwardly and swing said lever portions so as to move said shouldered portions of said engagement members apart; and means for holding said sleeve in said position surrounding said shouldered portions of said engagement members.

8. In a connector adapted to engage a shouldered member of the character described: a body having end and side openings; engagement members having shouldered portions movable toward each other into engagement with said shouldered member and movable away from each other to disengage said shouldered member, said engagement members having lever portions extending in said end opening of said body, pin means carried by said body so as to pivotally support said lever portions in said body, a sleeve supported on said body so as to be movable into a position wherein the end portion of said sleeve will surround said shouldered portions and hold them in engagement with said shouldered member; means acting between said sleeve and said lever portions through said side openings when said sleeve is moved into retracted position to swing said lever portions so as to separate said shouldered portions of said engagement members; and means for holding said sleeve in said position surrounding said shouldered portions of said engagement members.

9. In a connector adapted to engage a shouldered member of the character described: a body having end and side openings; engagement members having shouldered portions movable toward each other into engagement with said shouldered member and movable away from each other to disengage said shouldered member, said engagement members having lever portions extending in said end opening of said body, pin means carried by said body so as to pivotally support said lever portions in said body, a sleeve supported on said body so as to be movable into a position wherein the end portion of said sleeve will surround said shouldered portions and hold them in engagement with said shouldered member; and means acting between said sleeve and said lever portions through said side openings when said sleeve is moved into retracted position to swing said lever portions so as to separate said shouldered portions of said engagement members.

10. In a connector adapted to engage a shouldered member of the character described: a body having end and side openings; engagement members having shouldered portions movable toward each other into engagement with said shouldered member and movable away from each other to disengage said shouldered member, said engagement members having lever portions extending in said end opening of said body, pin means carried by said body so as to pivotally support said lever portions in said body, said lever portions having parts which project through said side openings when shouldered portions are moved toward each other; a sleeve supported on said body so as to be movable into a position wherein the end portion of said sleeve will surround said shouldered portions and hold them in engagement with said shouldered member; and cam means on said sleeve engaging said projecting parts of said lever portions when said sleeve is moved into retracted position on said tubular body, to force said projecting parts inwardly and swing said lever portions so as to move said shouldered portions of said engagement members apart.

EARLE D. GRIZZARD.
FRANK R. COLLAR.
JACK C. MITCHELL.

References Cited in the file of this patent

UNITED STATES PATENTS

| Number | Name | Date |
|---|---|---|
| 656,357 | Kramer | Aug. 21, 1900 |
| 1,575,149 | Craig et al. | Mar. 2, 1926 |
| 2,448,817 | McArthur | Sept. 7, 1948 |